C. J. YERGASON.
Apparatus for Mixing and Cooling Lard.

No. 219,423. Patented Sept. 9, 1879.

Attest:
Chas. M. Higgins.
John E. Gavin.

Inventor:
C. J. Yergason
by S. H. Wales & Son
Attys

UNITED STATES PATENT OFFICE.

CHRISTOPHER J. YERGASON, OF BROOKLYN, NEW YORK.

IMPROVEMENT IN APPARATUS FOR MIXING AND COOLING LARD.

Specification forming part of Letters Patent No. 219,423, dated September 9, 1879; application filed May 12, 1879.

*To all whom it may concern:*

Be it known that I, CHRISTOPHER J. YERGASON, of Brooklyn, Kings county, New York, have invented certain new and useful Improvements in Apparatus for Mixing and Cooling Lard, of which the following is a specification.

My invention is embodied in an improved form of machine for beating or mixing and cooling the lard, as hereinafter fully set forth, said machine being adapted to mix and cool lard according to the process which consists in running both hot and cold lard simultaneously into the same receptacle, and there grinding and mixing the two together by revolving blades or suitable grinders and mixers, whereby a better and more rapid and economical cooling effect is obtained and a more uniform and hard quality of lard is produced.

Figure 1:
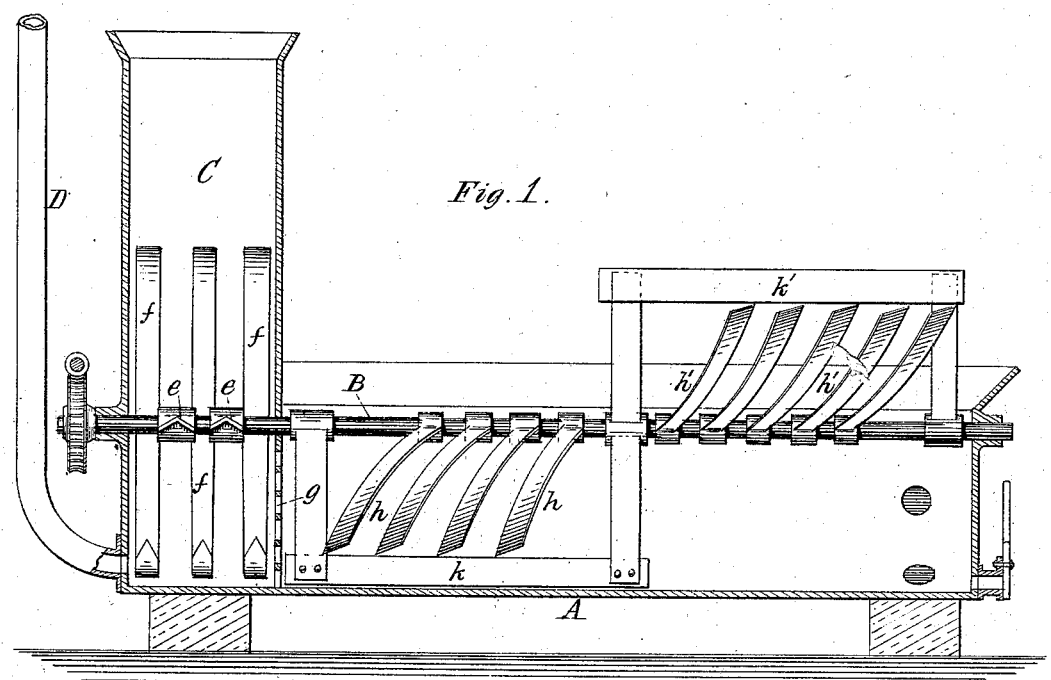
Figure 2:
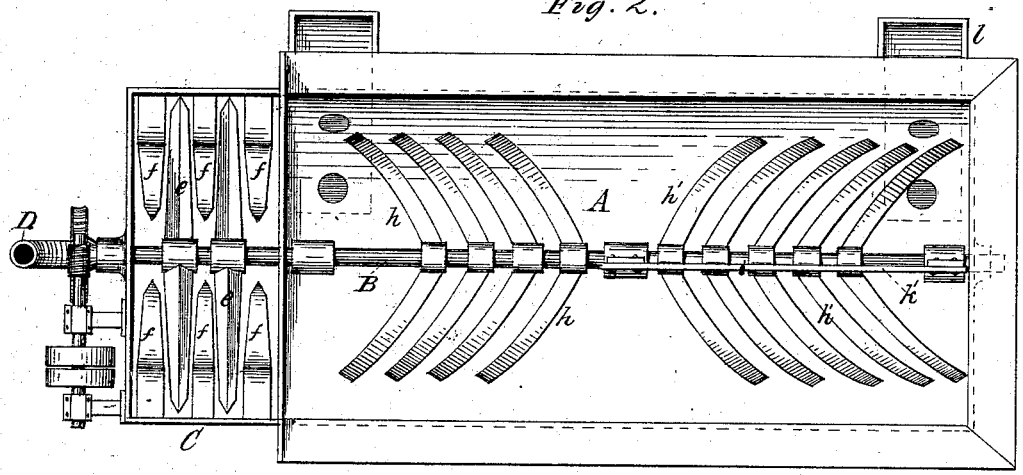

In the annexed drawings, Figure 1 presents a sectional elevation of my improved cooling and mixing apparatus, and Fig. 2 a plan view thereof.

In the drawings, A indicates a long semi-cylindrical trough or tank, which forms the main body of the apparatus, and which is open to the air at the top, its sides being slightly flaring from above its diameter, as shown. A shaft, B, extends longitudinally through the trough from end to end, being fitted within the trough with a series of grinding, mixing, and agitating blades for working the lard. One end of the shaft projects beyond the tank, and is actuated by worm-gearing, by which the shaft is slowly revolved to work the lard. The lard enters the apparatus through the receiving and mixing chamber C at one end, and, after passing through the cooling-trough, is delivered in a cooled and uniform but still fluid condition from the other end of the trough through suitable cocks or gates.

A pipe, D, leads into the bottom of the receiving-chamber on one end of the apparatus, and connects with the refining-kettles, from which the hot fluid lard is thus run into the chamber, while the upper portion of this chamber is extended vertically, and its open or hopper-shaped top may rise to the floor above to receive the cold or solidified lard, which is thus delivered downward into the top of the chamber.

The shaft within the grinding and receiving chamber is provided with a series of grinding-blades, $e\ e$, which project radially therefrom and closely approach the sides of the chamber during their revolution, and they work between stationary blades $f f$, extending from the sides of the chamber at right angles to the rotary blades, as shown.

A grated partition, $g$, separates the mixing-chamber from the cooling-trough to prevent any lumps of lard passing out, and this grating may be entirely closed by suitable gates to retain the lard in the mixing-chamber until it is thoroughly ground.

It is proper to here mention that two general qualities of lard come into the hands of lard-packers—a cruder kind, which requires remelting and refining, and a finer quality or "prime lard," which requires no such refining. It is therefore desirable to the packer, who puts up large quantities of the lard in small packages for general sale, to intimately combine these two qualities of lard, in order that the packed lard shall always be of a uniform and reliable quality.

It will now be seen that my improved apparatus provides a very effective and improved means for accomplishing this object. Thus the hot fluid lard from the refining-kettles is run through the pipe D into the bottom of the combining and grinding chamber C, while the cold and solid prime lard is at the same time fed into the top of the chamber while the shaft with its cutting-blades $e\ e$ is revolved, thus grinding up the lumps of solid lard and mixing the same thoroughly with the hot lard, the heat of the fluid lard thus materially aiding the blades in softening the solid lard and effecting a perfect combination, while the hot lard is at the same time cooled by the solid lard, and the whole mass thus gradually and effectually brought to a uniform temperature and quality. As the lard is thus thoroughly mixed by the solution of the cold in the hot, as well as by the grinding and incorporating action of the blades, it flows into the cooling and working trough A, where it is acted on by a different series of blades, $h\ h'$, on the shaft B, which, of course, revolves at the same speed as the grinding-blades $e$, or about fifteen revolutions a minute.

The lard as it flows into the trough A is supposed to be of a milky or creamy consistency, and is allowed to rise to nearly the height of the shaft B. The blades in the cooling-trough are designed to gently raise the lard in thin films and to expose the same to the cooling action of the air, and at the same time keep the whole mass constantly agitated or worked in a gentle yet effective manner, so as to gradually cool the same and impart to the lard a firm texture, with the quality of settling hard and solid to better resist the influences of hot climates.

These cooling and working blades, as indicated at $h\ h'$, are of a narrow and thin form, and extend diagonally from the shaft, being set slightly feathery or spiral, so as to enter the lard obliquely edgewise, and thus prevent the inforcing of air, and at the same time tend to impart a gentle progressive movement to the mass of the lard.

The blades, as shown, project in a parallel series from opposite sides of the shaft, and at opposite inclinations, or like a series of Vs set lengthwise and concentrically on the shaft, as shown.

It will also be seen that there are two sets of these V-blades, one set at each end of the trough and placed relatively reversed, one set being down while the other is up, while the feather of one set of blades is opposite to the other, thus tending to make two gentle opposite currents in the mass of the lard, one tending to move the mass to the induction end, while the other tends to move it to the eduction end.

Each set of the V-blades is also accompanied by a scraper, $k\ k'$, which extends out from the shaft and closely approaches the sides of the trough, being set parallel with the shaft and central with the V-blades, as shown. Each of these scrapers controls half of the trough and scrapes the thickening lard from the cooling sides of the trough, as well as assists the action of the blades in keeping the mass in uniform condition. The action of these blades and scrapers is therefore such that, while keeping the lard constantly agitated or worked in a gentle yet positive manner, it is also constantly raising it in thin films in the air, which cools it in a very effective manner, and also serves to impart to the lard a very uniform and firm texture, and at the same time avoids all aeration or frothiness, and this well qualifies it for use in hot climates.

When the apparatus is erected in buildings not having space enough to allow of draw-off cocks being placed on the eduction end of the trough, side pockets, $l\ l$, may project from the end of the apparatus to allow of the lard being dipped out of the same.

What I claim as my invention is—

A lard mixing, cooling, and texturing apparatus consisting of the combination of the receiving-chamber C, provided with hot-lard pipe D, the cooling and texturing trough A, grinding-blades $e\ f$, cooling and texturing blades $h$ and $h'$, and rotary shaft B, arranged and adapted to operate substantially as shown and described.

CHRISTOPHER J. YERGASON.

Witnesses:
 JOHN E. GAVIN,
 CHAS. M. HIGGINS.